Patented Aug. 19, 1930

1,773,491

UNITED STATES PATENT OFFICE

GÜNTHER MALYOTH, OF MUNICH, GERMANY

METHOD OF PRODUCING THE BLAST REQUIRED FOR BLAST-FURNACE OR SIMILAR PLANTS BY MEANS OF CALCIUM CARBIDE

No Drawing. Application filed June 23, 1928, Serial No. 287,881, and in Germany October 4, 1926.

The heating and drying of the blast of blast furnaces is generally known. These problems are closely related to each other.

The heated blast conveys a certain amount of heat to the blast-furnace, this amount depending on the temperature of the blast. The dried blast saves the expenditure of heat which would be necessary for the decomposition of the aqueous vapor in the furnace. Both mean an addition of heat. As contrasted with the savings resulting therefrom by a theoretical calculation, the practical operation brings out a multiple of the calculated addition of heat.

While the heating of the blast has been generally adopted, practical attempts to dry the air have proven unsuccessful heretofore. This may be explained first of all by the lack of a satisfactorily operating drying agent. Further it has been ascertained that the drying, when carried too far, becomes unsuitable, owing to the fact that the complete removal of the aqueous vapor causes a lack of hydrogen the importance of which for the reductional proceedings in the blast furnace has not been appreciated sufficiently heretofore.

The object of the present invention is to create a blast of a special composition on an economical basis by means of a drying agent which has not heretofore been employed for this purpose.

According to the invention this drying agent consists in calcium carbide. When the moist blast is conducted over calcium carbide a drying procedure occurs, or, the amount of moisture which is deemed necessary, can be maintained in an equable measure.

The purpose of employing calcium carbide is however not only the application of a new drying agent, but also to utilize the acetylene resulting from the removal of moisture, as an additional source of energy.

For this purpose the invention provides that the air which is dried by being passed over the calcium carbide and which even with a high moisture content never contains enough acetylene that an explosive mixture of air and acetylene forms, is conducted into the preheating apparatus which is heated by the combustion of the waste furnace gases, and burned therein. The amount of heat produced in this manner can heat the blast by some further 300° C. During this burning procedure half of the original amount of water is regenerated so that the original moisture of the blast is reduced to 50%. An increase of the temperature of the blast is of very appreciable importance. The reduction of the moisture to 50% guarantees the presence of the necessary amount of hydrogen which is of great importance for the reductional proceedings.

The acetylene can however not only be utilized for increasing the temperature of the blast, but the dry mixture of air and acetylene may also be conducted into the preheating apparatus the temperature of which is now maintained at about 350° C. by employing for instance only half of the waste furnace gas which previously has been required for the heating operation. This temperature being lower than the ignition temperature of the acetylene, the dry mixture of air and acetylene enters directly into the blast-furnace. There the acetylene which is mixed with the air decomposes into carbon and hydrogen, liberating an important amount of heat as a further energy source. Resulting from this procedure, these two reducing agents are of very great effectiveness.

The direct effect of the reduction of the temperature of the blast to about the half of what it usually has been before, is the saving of about 50% of the waste furnace gases which has been necessary for the heating of the preheating apparatus and which are thus rendered profitably usable as a source of energy.

By the method of applying calcium carbide as a drying agent a quantity of slaked lime is obtained as a waste product. The slaked lime can be used for producing iron, Portland cement, or other building materials, by mixing it with slag-sand and if desired with the finer parts of the furnace-dust which contain but little iron.

I claim:

1. In the art of operating blast furnaces, the herein described method of subjecting moist air to the action of calcium carbide and introducing the resulting gases into the furnace.

2. In the art of operating blast furnaces, the herein described method of subjecting a blast of moist air to the action of calcium carbide, introducing the resulting gases into the furnace preheater and therein reducing by approximately one-half the original moisture content of said gases.

3. In the art of operating blast furnaces, the herein described method of subjecting moist air to the action of calcium carbide, introducing the resulting gases into the furnace preheater, maintaining the preheater temperature below the ignition temperature of acetylene and effecting decomposition of the dry air-acetylene mixture within the furnace.

In testimony whereof I hereunto affix my signature.

Dr. GÜNTHER MALYOTH.